Sept. 4, 1928.  1,682,836
I. DOROGI ET AL
CLOSURE MEANS FOR INFLATABLE HOLLOW RUBBER BODIES
Filed Dec. 20, 1927
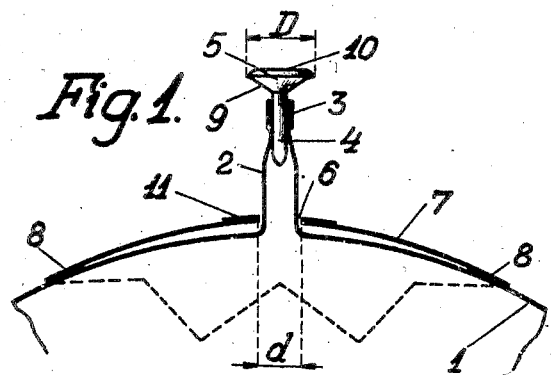
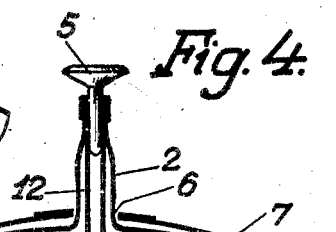
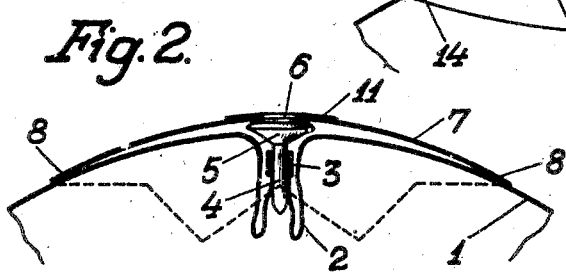
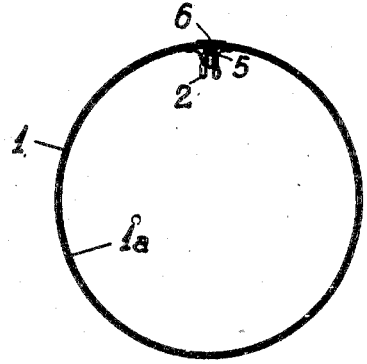
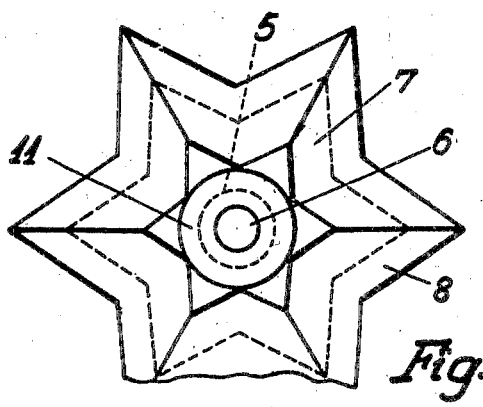
Inventors
István Dorogi
Lajos Dorogi
by Stewart & McKay
their attorneys Patented Sept. 4, 1928.

1,682,836

UNITED STATES PATENT OFFICE.

ISTVAN DOROGI AND LAJOS DOROGI, OF BUDAPEST, HUNGARY, ASSIGNORS TO DR. DOROGI ÉS TÁRSA GUMMIGYÁR R. T., OF BUDAPEST-ALBERTFALVA, HUNGARY, A LIMITED COMPANY OF HUNGARY.

CLOSURE MEANS FOR INFLATABLE HOLLOW RUBBER BODIES.

Application filed December 20, 1927, Serial No. 241,403, and in Germany January 17, 1927.

This invention relates to closure means for inflatable hollow rubber bodies, particularly balls, wherein it is important that the inflating nipple or connection together with the closure organ should, after the inflation, be concealed within the interior of the hollow body in such a manner that the continuity of the exterior surface thereof is not impaired.

The essential feature of the novel closure resides in the inflating nipple or connection, which may be closed by a plug provided with a button shaped head, being covered by an elastic rubber covering or skin which forms a part of the outer wall of the hollow body and has an expansible opening; the latter allows the inflating connection to be introduced but in the unstretched condition is smaller than the head at the end of the closure plug.

Three embodiments of the novel closure are illustrated by way of example in the accompanying drawing in which:

Fig. 1 is a section of one embodiment showing the inflating connection withdrawn from the hollow body, Fig. 2 is a similar view of the same closure with the connection depressed into the hollow body, Fig. 3 a plan corresponding to Fig. 2, Fig. 4 is a sectional view of a second embodiment of the closure and Fig. 5 is a cross-section of a rubber ball provided with the novel closure.

Referring to Fig. 1 of the drawing the reference numeral 1 indicates the wall of the hollow body to be inflated which is furnished with a thin walled flexible inflating nipple or connection 2. A plug 4 is adapted to be introduced into the strengthened mouth 3 of the said connection and according to the invention carries a button shaped head 5 the diameter D of which is larger than the outside diameter of said connection.

The inflating connection is passed through an opening 6 in an extensible rubber covering or skin 7 which forms a part of the outside wall of the hollow body, said piece of rubber 7 being, for example, stuck at its periphery, as at 8, to the outside of the wall of the hollow rubber body 1. The diameter $d$ of the opening 6 is less than the diameter D of the head 5 of the plug which is preferably of conical shape on the side 9 towards the plug 4 while the outer surface 10 of the head is preferably slightly convex.

If the hollow body is to be inflated the plug 4 is first removed from the connection 2. After inflation said connection 2 is closed again by means of the plug 4 and is then forced, by pressing on the plug-head 5 through the opening 6 into the interior of the inflated hollow body; next the head 5 is also forced through the opening 6 in the covering 7, the opening being stretched to allow said head to pass through. This stretching is facilitated by the conical shape of the lower surface 9 of the plug head. Immediately the head 5 has been pressed through the opening 6 of the edge 11, which is preferably strengthened, the latter contacts and covers said head 5, in the manner illustrated in Fig. 2, so that the internal air pressure presses the outer surface 10 of the plug-head against the covering 7 forming a part of the wall of the hollow body.

As is evident from Fig. 2 all the parts of the closure are, when in this condition, concealed in the interior of the hollow body in such a manner that the continuity of the exterior surface of the hollow body is unbroken.

In consequence the said closure is primarily suitable for inflatable balls, used in games and sports, with which it is particularly important that the smoothness and roundness of the outer surface should be preserved.

To simplify the forcing of the connection 2 through the opening 6 provision is made in the case of the modification illustrated in Fig. 4 of a strong hard tube 12, preferably of rubber, in the interior of the thinner walled, softer inflation connection 2, said tube preferably being somewhat longer than said connection 2 so that the end of the tube 12 projects through the opening 6 into the interior of the hollow body even when the connection 2 is drawn out. In the example illustrated in Fig. 4 moreover the covering 7 is in one piece with the wall 1 of the rubber hollow body to be inflated and a separate wall portion 13 carrying the inflating connection 2 and movable, relatively to the covering 7, towards the interior of the hollow body is stuck to the inside of the wall 1 as at 14.

An arrangement which is even more suitable is illustrated in Fig. 5 wherein the hollow body consists of two expansible rubber bladders 1 and 1ª one of which is inserted in the other while the expansible opening 6 serving for the entry of the inflating connection and the plug-head 5 is located in the outer bladder 1.

If the air is to be allowed to escape from the hollow body, the opening 6 in the cover skin 7 may easily be stretched to such an extent that the head 5 may be forced outwardly and the inflating connection 2 then drawn out readily through the opening 6 by means of the head. The closure may then be broken by removing the plug 4.

Having now particularly described and ascertained the nature of our said invention and in what manner the same is to be performed, we declare that what we claim is:—

1. Closure means for inflatable hollow rubber bodies characterized by the inflating nipple, which may be closed by a plug provided with a button shaped head, being covered by an elastic rubber covering which forms a part of the outer wall of the hollow body and has an expansible opening, which allows the inflating nipple to be introduced but which in the unstretched condition is smaller than the head of the closure plug.

2. Closure means for inflatable hollow rubber bodies according to claim 1, characterized by the provision in the interior of the thin walled, soft inflation nipple of a separate stiffer tube which is connected with said nipple at the mouth.

3. Closure means for inflatable hollow rubber bodies according to claim 2, characterized by the length of the stiffer tube in the interior of the soft inflation nipple being made such that on the withdrawal of the nipple the inner tube projects through the opening in the outer rubber covering.

4. Closure means for inflatable hollow rubber bodies according to claim 1, characterized by the head of the closure plug being made of conical shape on the side toward the plug.

5. Closure means for inflatable hollow rubber bodies according to claim 1, characterized by the hollow body consisting of two expansible rubber bladders one of which is inserted in the other, the inflation nipple being mounted on the inner bladder while the expansible opening serving for the entry of the inflating nipple and the closure plug head is located in the outer bladder.

In testimony whereof we affix our signatures.

ISTVÁN DOROGI.
LAJOS DOROGI.